2,960,461

INHIBITOR SWEETENING OF OLEFINIC POLYMER

Warren A. Bonawitz, La Marque, Tex., assignor to The American Oil Company, Texas City, Tex., a corporation of Texas No Drawing. Filed Dec. 12, 1958, Ser. No. 779,847

7 Claims. (Cl. 208—206)

This invention relates to sweetening of highly-branched olefinic polymer, boiling in the gasoline range, by the use of the phenylene diamine oxidation inhibitor process.

Because of its relative simplicity, a sweetening process for olefin containing naphthas involving the use of phenylene diamine oxidation inhibitor as a catalyst has come into wide use in refinery operations. This process is of particular utility in the sweetening of thermally cracked naphthas and catalytically cracked naphthas. The process can be used on saturated naphthas by treating this in admixture with unsaturated naphthas. This particular modification of a process, as well as an excellent description of this type of sweetening, is set out in U.S. Patent 2,694,034, issued November 9, 1954.

It has been generally accepted that this phenylene diamine oxidation inhibitor sweetening process is applicable to any olefinic material, particularly those boiling in the gasoline range. It has been discovered that highly-branched olefinic polymers, boiling in the gasoline range, cannot be sweetened by the phenylene diamine oxidation inhibitor process.

An object of the invention is a method of sweetening highly-branched olefinic polymers utilizing phenylene diamine oxidation inhibitor as a catalyst. Other objects will become apparent in the course of the detailed description of the invention.

It has been found that highly-branched olefinic polymer, boiling in the gasoline range, which is sour to the Doctor Test, i.e., contaminated with an objectionable amount of mercaptan, can be sweetened by the phenylene diamine oxidation inhibitor process by commingling with the sour polymer, in the presence of caustic and the phenylene diamine inhibitor, an olefinic hydrocarbon. This olefinic hydrocarbon must be capable of participating in mercaptan conversion reactions which are catalyzed by phenylene diamine oxidation inhibitors. When this mixture is contacted with free oxygen, it is possible to react the mercaptans and obtain an essentially mercaptan-free polymer product, i.e., a sweet polymer product.

Highly-branched olefinic polymers, boiling in the gasoline range, which are contaminated with an objectionable amount of mercaptan, do not respond to the use of phenylene diamine oxidation inhibitor catalyzed sweetening. It is to be understood that the defined polymer contains objectionable amounts of mercaptan when application of the Doctor Test gives a result which is positive or "off." The highly-branched olefinic polymers, which are the feed to the method of the invention, are most commonly derived by polymerization of propylene and/or butylenes, as contained in refinery gases. The most commonly used processes operate with a phosphoric acid type catalyst. These phosphoric acid type catalysts may be liquid phophoric acid on quartz, the so-called solid phosphoric acid catalyst, or copper pyrophosphate on a carrier. In addition to the phosphoric acid type catalyst, gasoline boiling range polymers may be obtained utilizing Friedel-Craft's catalysts, sulfuric acid, etc. The most widely used process involves the phosphoric acid type catalysts; commercial operations with such catalysts are described in detail in the following publications: Process in Petroleum Technology, pp. 97–108 (American Chemical Society, 1951) and "Catalytic Polymerization," Weinert and Egloff, Petroleum Processing, June 1948, pp. 585–593.

The method of the invention is particularly applicable to the very highly-branched olefinic polymers produced by polymerization of propylene over a phosphoric acid type catalyst. In general, the method is applied to polymers which boil in the gasoline range, that is, broadly, from about 100° F. through 435° F. The polymer feed to the method may be a single compound or a number of compounds which boil very close together or which may be a mixture of compounds providing a smooth ASTM curve over the entire gasoline boiling range.

The sweetening agent used in the process of this invention is one which acts as an oxidation inhibitor as well as a catalyst for the conversion of mercaptans to disulfides. The sweetening agent comprises a phenylene diamine type inhibitor and more particularly N,N'-di-secondary-butyl-p-phenylene diamine. However, it is understood that other phenylene diamine inhibitors may be employed including N,N'-di-alkyl-p-phenylene diamines in which the alkyl groups contain from 1 to about 12 carbon atoms per molecule including such compounds as N,N'-di-isopropyl-p-phenylene diamine, N,N'-di-amyl-p-phenylene diamine, N,N'-di-hexyl-p-phenylene diamine, etc., as well as those in which the alkyl groups are different as, for example, in such compounds as N-propyl-N'-butyl-p-phenylene diamine, N-butyl-N'-amyl-p-phenylene diamide, N-hexyl-N'-octyl-p-phenylene diamine, etc.

Sufficient of the phenylene diamine inhibitor must be present to promote the mercaptan conversion reaction at a reasonable rate and also to obtain the desired sweet product. In general, the amount of mercaptan present will have a bearing on the minimum amount of phenylene diamine inhibitor needed. In the normal range of mercaptan content of polymers from refinery operations on typical propylene and butylene containing streams, the inhibitor amount present will range from between about 1 and 40 lbs. per 1000 bbls. (42 gal.) of polymer to be sweetened. More usually the usage of the inhibitor is between about 5–20 lbs. per 1000 bbls of sour polymer.

The olefinic hydrocarbon may be any one of the many which is capable of participating in mercaptan conversion reactions catalyzed by phenylene diamine oxidation inhibitor. The chemistry of phenylene diamine inhibitor sweetening and the classes of olefins useful therein are presented in "Chemistry of Inhibitor Sweetening: Effects of Variation in Olefins and Caustic," R. H. Rosenwald. Petroleum Processing, pp. 91–95, October 1956.

Sufficient olefinic hydrocarbon must be commingled with the sour polymer to permit reaction with mercaptans to produce an essentially mercaptan-free polymer product. The amount of olefinic hydrocarbon needed will depend upon the particular olefin and the mercaptan content of the sour polymer.

Particularly suitable because of their ready availability to the average refiner are the olefin hydrocarbons contained in cracked naphthas, such as thermally cracked naphtha and catalytically cracked naphtha. It has been found that, for typical highly-branched olefinic sour polymers, satisfactory rates of sweetening are obtained using thermally cracked naphtha in an amount between about 10–25 volume percent based on sour polymer charged.

Other unsaturated compounds may comprise a particular type of olefin, such as: Diolefins: including allene, butadiene, isoprene, methylisoprene, pentadiene, methylpentadiene, etc.; a branch-chain olefin: which generally will contain from about 4 to about 12 carbon atoms per molecule and includes such olefins as isobutene, isopentene, isohexene, isoheptene, isooctene, isononene, isodecene, isoundodecene, isododecene, 2,2-dimethyl propene, 2,2-dimethyl butene, 2,2-dimethyl pentene, 2,2-dimethyl hexene, etc., 3,3-dimethyl pentene, 3,3-dimethyl hexene, 3,3-dimethyl heptene, 3,3-dimethyl octene, etc., 2,3-dimethyl-butene, 2,3-dimethyl pentene, 2,3-dimethyl hexene, 2,3-dimethyl pentene, 2,3-dimethyl-octene, etc., 2,2,3-trimethylbutene, 2,2,3-trimethylpentene, 2,2,3-trimethylhexene, 2,2,3-trimethylheptene, 2,2,3-trimethyloctene, etc., 2,2,3,3-tetramethylbutene, 2,2,3,3-tetramethylpentene, 2,2,3,3-tetramethylhexene 2,2,3,3-tetramethylheptene, 2,2,3,3-tetramethyloctene, etc.; a straight-chain olefin: which generally will contain from about 4 to about 12 carbon atoms and includes such compounds as butene-1, butene-2, pentene-1, pentene-2, hexene-1, hexene-2, hexene-3, heptene-1, heptene-2, heptene-3, octene-1, octene-2, octene-3, octene-4, etc.; a cycloolefin: including cyclohexene and alkyl derivatives thereof such as methylcyclohexene, ethylcyclohexene, propylcyclohexene, etc., polymethylcyclohexenes, polyethylcyclohexene, polypropylcyclohexenes, cyclohexadiene, similarly substituted cyclohexadienes, etc.; an unsaturated alkyl aromatic compound: such as styrene, alkylbenzene, phenylbutadiene, phenylacetylene, etc.; and mixtures of the unsaturated compounds herein set forth.

The aqueous caustic solution may contain either sodium hydroxide or potassium hydroxide. In general the aqueous caustic solution will contain between about 1 weight percent of caustic and the saturation amount, about 50 weight percent. It is preferred to use an aqueous caustic solution containing between about 5 and 15 weight percent of alkali metal hydroxide.

At least enough aqueous caustic solution must be used in the contacting of the raw-naphtha-inhibitor mixture to have present a distinct aqueous caustic phase. In some instances satisfactory results are obtainable by having only enough aqueous caustic solution present to form a haze in the mixture. More than this amount is usually desirable. Generally at least enough aqueous caustic solution is used to form a distinct, separate aqueous phase. Based on raw naphtha charged, the amount of aqueous caustic solution used may be between about 5 and 100 volume percent.

The sweetening does not occur in the absence of free-oxygen. The free-oxygen may be derived either from the atmosphere by the use of air or by means of commercial cylinder oxygen. The amount of free-oxygen needed is at least about the stoichiometric equivalent of mercaptan sulfur present in the naphtha, i.e., 1 mole of free-oxygen per 4 moles of mercaptan or 3 standard cubic feet of oxygen per pound of mercaptan sulfur. More than this amount is desirable and it is preferred to use between about 150 and 250% of the stoichiometric requirement.

The process of the invention may be utilized at temperatures as high as about 200° F. Temperatures as low as about 50° F. may be used when reaction rate is of little moment. It is preferred to operate at temperatures below about 110° F. as the naphtha sweetened at these temperatures has a more agreeable odor than does the naphtha sweetened at temperatures such as 150° F. or higher. It is preferred to carry out the sweetening step at a temperature between about 80° and 100° F.

The process may be carried out by contacting the polymer-inhibitor mixture with aqueous caustic solution and substantially simultaneously with free-oxygen. The contacting is maintained for a time sufficient to substantially sweeten the naphtha. The process may also be carried out by contacting the mixture with aqueous caustic solution, separating an aqueous caustic phase from a phase comprising naphtha and some occluded aqueous caustic solution and contacting this naptha phase with free-oxygen until a substantially sweet naphtha is obtained. The occluded aqueous caustic solution may be separated from the sweet naphtha by a settling operation or by passage through a coalescer such as a salt drum or sand filter. Frequently the amount of occluded solution is so slight that normal storage will result in the separation of sufficient aqueous solution to permit the naphtha to be used for commercial products without any special further dehazing treatment.

The preferred method of operation of the process comprises contacting the naphtha-inhibitor-oxygen mixture with an aqueous NaOH solution containing between about 5 and 15 weight percent NaOH in an amount sufficient to form a separate aqueous caustic layer and separating the extracted naphtha from an aqueous caustic layer. The process is carried out at a temperature between about 80° and 100° F.

ILLUSTRATIVE EXAMPLES

The method of the invention is illustrated both by small scale laboratory sweetening and large scale continuous sweetening of sour polymer. The sour polymer gasoline utilized in the working examples was derived by polymerization of propylene, in admixture with propane, over solid phosphoric acid catalyst in the so-called UOP phosphoric acid polymerization process. The sour polymer gasoline boiled over the ASTM range of 100° F. through 400° F.

Example 1 below was carried out using a laboratory procedure as follows: About 400 cc. of sour gasoline 40 cc. of 10 wt. percent caustic (NaOH) are shaken in a quart bottle for one minute. The caustic is allowed to settle out, is decanted off, and discarded. Air is then bubbled through the gasoline for about 10 seconds and inhibitor (antioxidant-N,N'-di-sec-butyl-p-phenylene diamine) added, usually at a concentration of about 8.4 lbs./1000 bbls. (42 gal.). The caustic treat is then repeated, discarding the settled caustic. The sample is then stored at ambient temperatures and mercaptan content and/or the Doctor Test is run daily to determine sweetening rate.

*Example 1*

The sour polymer gasoline in this example had a mercaptan content, calculated as sulfur, of 0.029 weight percent and was sour to the Doctor Test. A sample of this polymer gasoline was treated as above. After seven days time, the treated gasoline was still sour to the Doctor Test.

The same sour polymer gasoline was treated as described above, in the presence of 0.5 cc. of isoprene. The isoprene, 0.13 volume precent, was added after the first caustic contacting. Immediately after the treating, the treated polymer gasoline was still sour to the Doctor Test. After three days the treated polymer gasoline was sweet to the Doctor Test.

*Example 2*

Example 2 was carried out on a large scale in a continuous operation. The sour polymer gasoline was admixed with the olefin containing gasoline, N,N'-di-sec-butyl-p-phenylene diamine inhibitor, air and caustic. All these were passed through a mixer and then into a settler. The bottom caustic layer was recycled and the treated gasoline withdrawn from the top and passed to storage for sweetening. In this example, the circulating aqueous caustic solution contained 5 weight percent of sodium hydroxide and 12 volume percent of cresols derived from thermally cracked naphtha.

The sour polymer gasoline contained 0.029 weight percent of mercaptans calculated as sulfur. 15 volume percent of a thermally cracked gasoline boiling over the range of 100° F. through 400° F. was admixed with the sour polymer gasoline. The inhibitor usage was 7.9 lbs. per 1000 bbls. of polymer. The air usage was 0.5 standard cubic feet per barrel of sour polymer. After four days of storage, the treated gasoline was just barely sour to the Doctor Test and became sweet on the fifth day of storage.

Example 3

In the continuous operation described above, another sample of sour polymer gasoline was treated. This sour polymer contained 0.017 weight percent of mercaptan calculated as sulfur. The thermally cracked gasoline usage was 15 volume percent and the inhibitor usage was 3.3 lbs. per 1000 bbls. of polymer charged. After four days of storage, the treated gasoline was sweet to the Doctor Test.

Thus having described the invention, what is claimed is:

1. A method of sweetening highly-branched olefinic polymer, boiling in the gasoline range, which polymer is contaminated with an objectionable amount of mercaptan, which method comprises commingling with said sour polymer, in the presence of caustic, a phenylene diamine oxidation inhibitor, an olefinic hydrocarbon, which hydrocarbon is capable of participating in mercaptan conversion reactions catalyzed by said inhibitor, and free-oxygen, said hydrocarbon, said inhibitor and said oxygen being present in amounts suitable for reacting said mercaptan to obtain an essentially mercaptan-free polymer product.

2. The method of claim 1 wherein said polymer is the product of propylene polymerized by a phosphoric acid-type catalyst.

3. The method of claim 1 wherein said diamine is N,N'-di-sec-butyl-p-phenylene diamine.

4. The method of claim 3 wherein said diamine is present in an amount between about 5–20 lbs. per 1000 bbls. (42) of said polymer.

5. The method of claim 1 wherein said hydrocarbon is a diolefin.

6. The method of claim 1 wherein said hydrocarbon is a cracked naphtha.

7. The method of claim 6 wherein said cracked gasoline is present in an amount between about 10–25 volume percent based on said polymer.

References Cited in the file of this patent

UNITED STATES PATENTS

| | | |
|---|---|---|
| 2,766,181 | Sorg | Oct. 9, 1956 |
| 2,793,171 | Keller | May 21, 1957 |